W. M. WHITE.
TURBINE GATE MECHANISM.
APPLICATION FILED MAY 10, 1915.
1,246,200.
Patented Nov. 13, 1917.
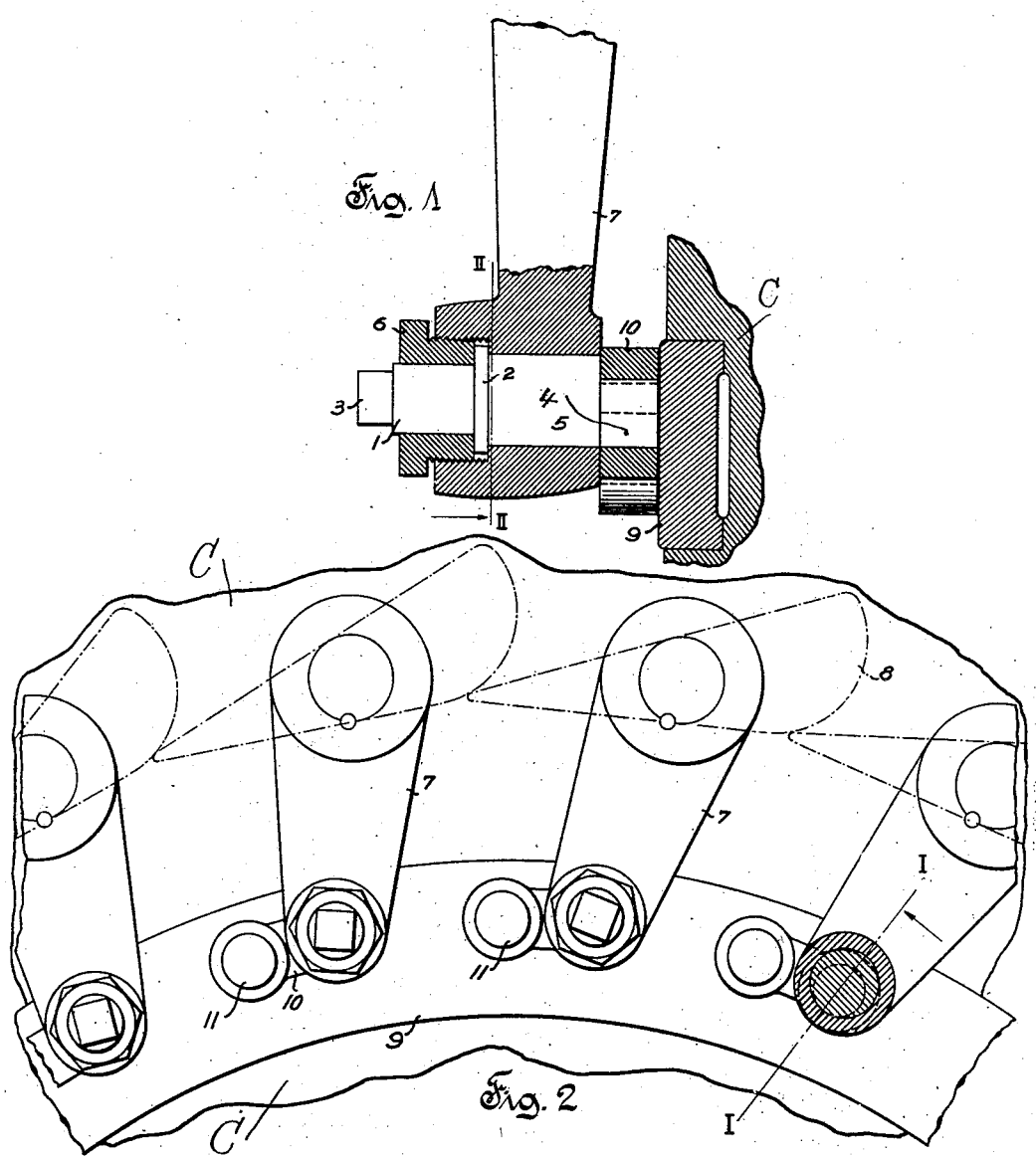

UNITED STATES PATENT OFFICE.

WILLIAM MONROE WHITE, OF MILWAUKEE, WISCONSIN.

TURBINE-GATE MECHANISM.

1,246,200.     Specification of Letters Patent.     Patented Nov. 13, 1917.

Application filed May 10, 1915. Serial No. 27,729.

*To all whom it may concern:*

Be it known that WILLIAM MONROE WHITE, a citizen of the United States, residing at Milwaukee, in the county of Milwaukee and State of Wisconsin, has invented a certain new and useful Improvement in Turbine-Gate Mechanisms, of which the following is a specification.

This invention relates to improvements in the construction of mechanism for connecting a pair of relatively movable members, and is particularly applicable to pin and link mechanisms for connecting the actuating ring with the guide vane arms of a hydraulic turbine gate rigging.

An object of the invention is to provide a device for connecting a pair of relatively movable machine elements, which is simple in construction and efficient in operation. Another object is to provide a connection between several machine elements which may be readily inserted and removed, thereby permitting ready assembling and disassembling of the machine. Still another object is to provide means between two relatively movable members, which will permit ready relative adjustment of the members. A further object is to provide suitable means for locking the adjusting means in place. Another object is to provide a mechanism in which the pressures are evenly distributed over the bearing surfaces, thereby preventing buckling of the coacting elements.

A clear conception of an embodiment of the invention may be had by referring to the drawing accompanying and forming a part of this specification in which like reference characters designate the same or similar parts in the several views.

Figure 1 is a fragmentary enlarged part sectional view through a turbine casing, guide vane actuating arm, ring, connecting pin, locking bushing and link, the section being taken along the line I—I of Fig. 2.

Fig. 2 is a fragmentary view of a turbine guide vane actuating ring showing several of the individual guide vane actuating mechanisms connected therewith and showing a section through one of the actuating arms and a pin, the section being taken along the line II—II of Fig. 1, looking in the direction of the arrow.

The ordinary Francis turbine gate actuating mechanism comprises a guide vane actuating member or ring 9, a plurality of guide vane actuating members or arms 7, and a plurality of connecting links 10. The ring 9 is preferably mounted for oscillation upon the turbine casing C, concentrically with the turbine shaft. The arms 7 are secured to the actuating stems of the individual guide vanes 8 by means of keys and are adapted to swing the guide vane 8 in an anticlockwise direction from the position shown in Fig. 2. Each of the connecting links 10 is provided with a pair of through bores, one of which coacts with a pin 11 secured to the ring 9, and the other of which coacts with a projecting eccentric portion 4 of the guide vane actuating pin 1. The bores in the connecting links 10 form bearing surfaces which lie within the bodies of the links.

The pin 1 engages a bore in one of the members 7, 9, being disclosed as engaging a bore in the end of the arm 7 along a cylindrical portion 5 of the pin which is directly adjacent the eccentric portion 4 thereof. An enlarged portion or collar 2 formed on the pin 1 engages a surface at the end of a counterbore formed in the arm 7. The pin 1 is rotatable within and relatively to the arm 7 by means of a squared portion 3 formed at the outer extremity of the pin. The locking element or bushing 6 has screw threaded engagement with the counterbore of the arm 7 and has a central bore which engages a cylindrical portion of the pin 1. With the bushing 6 screwed in place as indicated in Fig. 1, the collar 2 on the pin 1 is clamped firmly between the end of the bushing 6 and the counterbored surface of the arm 7.

If it is desired to angularly adjust one of the members or arms 7 relatively to the member or ring 9 in order to place it in the proper position when closed, this may be readily done by loosening the corresponding locking element or bushing 6 and rotating the pin 1 within its corresponding arm 7. If it is desired to remove either a pin 1 or a link 10, this may readily be done by entirely removing the locking bushing 6 and withdrawing the pin 1 after which the link 10 may be swung clear of the adjacent arm 7 and freely withdrawn from its supporting pin 11 on the ring 9.

It will be noted that with this construction, the pin 1 and link 10 may be quickly removed without disturbing either the ring 9 or the actuating arm 7. While the element or pin 1 is disclosed as having external eccentric surfaces only engaging the arm 7 and link 10 respectively, it is obvious that one of these surfaces may be internal. The use of a pin with external eccentric surfaces permits formation of the element 1 with a minimum friction radius, thus permitting easy adjustment. While the bearing surfaces on the link 10 are disclosed as lying within the body of the link, such construction is not essential.

It should be understood that it is not desired to be limited to the exact details of construction shown and described, for obvious modifications will occur to a person skilled in the art.

It is claimed and desired to secure by Letters Patent,—

1. In combination, a casing, a pair of members adjacent said casing, a recessed member connecting said pair of members, and an element locked to one of said three members and having surfaces of revolution eccentric relatively to each other, said surfaces respectively engaging one of said pair of members and said connecting member recess, and said element being adapted to be both unlocked and removed from the member to which it is locked from a side thereof remote from said casing.

2. In combination, a casing, a pair of members adjacent said casing, a recessed link connecting said pair of members, and a pin locked to one of said members and having cylindrical outer surfaces eccentric relatively to each other, said surfaces respectively engaging said locked member and said link recess, and said pin being adapted to be both unlocked and removed from said link from a side thereof remote from said casing.

In testimony whereof, the signature of the inventor is affixed hereto.

WILLIAM MONROE WHITE.

Copies of this patent may be obtained for five cents each, by addressing the "Commissioner of Patents, Washington, D. C."